United States Patent
Nagano et al.

(10) Patent No.: US 8,264,986 B2
(45) Date of Patent: Sep. 11, 2012

(54) WIRELESS COMMUNICATION NETWORK, METHOD OF GENERATING NEIGHBOR LIST IN THE WIRELESS COMMUNICATION NETWORK, AND CONTROL DEVICE THEREFOR

(75) Inventors: Rumiko Nagano, Kawasaki (JP); Mikio Kuwahara, Yokohama (JP); Akihiko Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 12/790,260

(22) Filed: May 28, 2010

(65) Prior Publication Data

US 2010/0322107 A1 Dec. 23, 2010

(30) Foreign Application Priority Data

May 29, 2009 (JP) .................... 2009-129806

(51) Int. Cl.
*H04L 12/28* (2006.01)
*H04Q 7/00* (2006.01)
(52) U.S. Cl. ...................... 370/255; 370/328
(58) Field of Classification Search .............. 370/254, 370/255, 328, 338, 401
See application file for complete search history.

(56) References Cited

U.S. PATENT DOCUMENTS

| 5,953,320 | A * | 9/1999 | Williamson et al. | 370/252 |
| 6,505,043 | B1 * | 1/2003 | Aihara | 455/436 |
| 7,155,223 | B2 * | 12/2006 | O'Brien | 455/436 |
| 8,059,602 | B2 * | 11/2011 | Kim | 370/331 |
| 2004/0174845 | A1 * | 9/2004 | Koo et al. | 370/328 |
| 2007/0097938 | A1 * | 5/2007 | Nylander et al. | 370/338 |
| 2009/0052350 | A1 * | 2/2009 | Chen et al. | 370/255 |
| 2011/0122821 | A1 * | 5/2011 | Laroia et al. | 370/328 |

OTHER PUBLICATIONS

Fujitsu; Base Transceiver Station for HSDPA; Fujitsu vol. 8, No. 2; Mar. 2007; pp. 114-117.

* cited by examiner

*Primary Examiner* — Hong Cho
(74) *Attorney, Agent, or Firm* — Foley & Lardner LLP

(57) ABSTRACT

In a wireless communication system, a base station control device has following two steps on the basis of latitude/longitude information obtained from a GPS, that is, a first step of recognizing, from the positional information obtained from the GPS, the fact that base stations in new and old systems are installed at the same location, and a second step of linking a neighbor list of the old system to a neighbor list of the new system with use of the result of the first step.

6 Claims, 12 Drawing Sheets

FIG.9
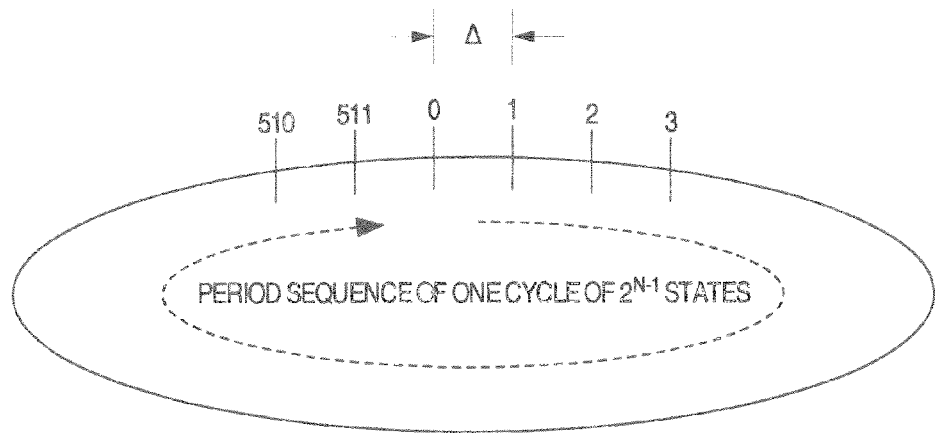
FIG.10
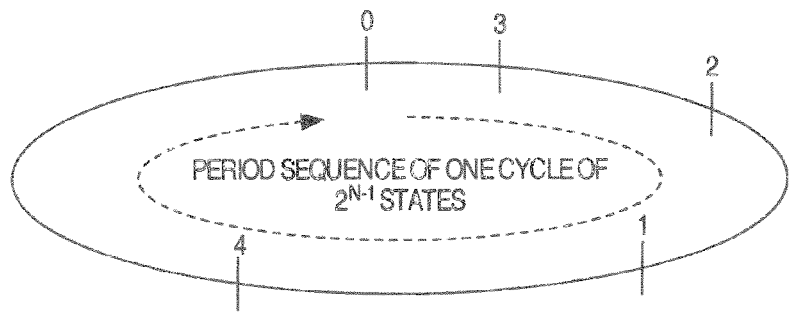
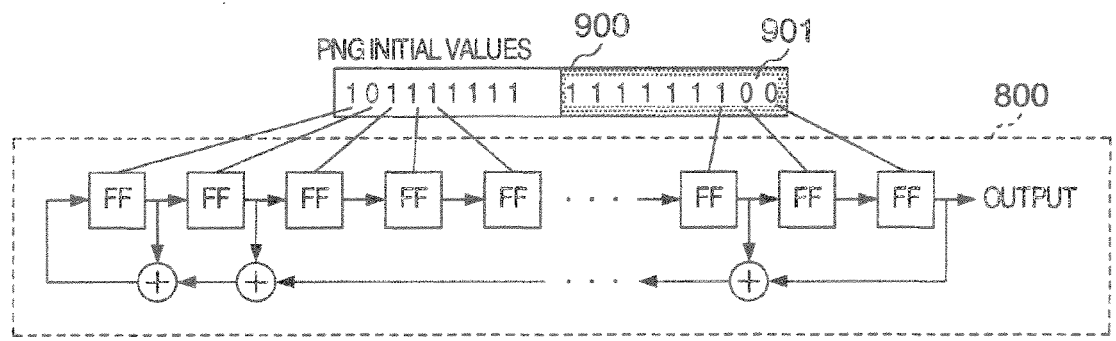

WIRELESS COMMUNICATION NETWORK, METHOD OF GENERATING NEIGHBOR LIST IN THE WIRELESS COMMUNICATION NETWORK, AND CONTROL DEVICE THEREFOR

INCORPORATION BY REFERENCE

The present application claims priority from Japanese application JP2009-129806 filed on May 29, 2009, the content of which is hereby incorporated by reference into this application.

BACKGROUND OF THE INVENTION

The present invention relates to a mobile wireless communication technique and more particularly, to a system parameter setting technique in the mobile wireless communication system.

As a mobile wireless communication technique is advanced, a bit cost is being reduced. When a shift is desired from an existing system to a new system or when a new system is introduced while also maintaining an existing system, it becomes important to reduce an initial investment cost, introduce the new system more smoothly, and start the service of the new system more quickly. In order to remarkably reduce the initial investment cost, its key point is to utilize the resources of the existing system as much as possible. For example, use of a power supply or a frame in the existing system can lead to highly effective reduction of its initial cost. An example of such techniques of utilizing an existing system is disclosed in a magazine entitled "FUJITSU" 2007 March (Vol. 58 No, 2), Special Supplement 1:3.5 Generation Mobile Communication Base Transceiver Station for HSDPA (http://img.jp.fujitsu.com/downloads/jp/jmag/vol58-2/paper 03.pdf).

In mobile communication, meanwhile, such a handover mechanism as to maintain a communication continuity even when a mobile terminal is moved across different base stations, is already established so that the mobile terminal can be freely moved within the cover areas of the base stations. For the purpose of attaining handover, a reception signal power of a signal transmitted from a base station being now connected to the mobile terminal is compared with reception signal powers of signals transmitted from a plurality of adjacent base stations (searching). The searching of the adjacent base stations imposes a heavy processing load on the mobile terminal. In order to avoid it, in a mobile wireless communication system, there is generally introduced such a mechanism that fundamental information (base station identifiers in physical layer) of the adjacent base stations called a neighbor list is informed from the base station to the mobile terminal. The mobile terminal can reduce its searching load by inviting searching range on the basis of the neighbor list received from the base station.

In the prior art, the neighbor list is designed mostly by human work such as measuring of the actual propagation state based on computer-aided propagation simulation, operating experimental tests or the like. Thus creation of neighbor lists of tens of thousands of base stations installed in order to cover a vast area results in a highly large number of steps and a lot of time.

SUMMARY OF THE INVENTION

It is therefore an object of the present invention to solve the above problems in the prior art, that is, when a shift is desired from an existing system to a new system or when the new system is introduced while also maintaining the existing system, to enable to use neighbor lists which require a very large number of steps for their creation and which are already used in the existing system, in the new system.

On the basis of longitude/latitude information obtained from a OPS, a base station control device takes two steps which follow. That is, the base station control device has a first step of recognizing the fact that base stations of the new and old systems are installed at the same locations on the basis of the positional information obtained from the GPS, and a second step of relating the neighbor lists of the old system to those of the new system using the result of the first step.

The above object is attained by a neighbor list conversion method which has the first step of establishing matching of neighbor lists (made up of identifiers in different physical layers) of a plurality of wireless systems installed at the same location between the base stations installed at the same location on the basis of GPS information of the base stations obtained in the respective systems when neighbor lists of one of the plurality of systems are created from the neighbor lists of another system, and also has the second step of converting the physical layer identifiers of one system to physical layer identifiers of another system on the basis of the result of the first step.

The above object is also attained by a base station control device which can be connected to base station devices and also to a base station control device of another system. A signal processor in the control device has the above neighbor list conversion method to create neighbor lists of a new system to be managed by the control device from neighbor lists of the other system obtained from the control device of the other system.

The above object is also attained by a base station device which is connected to the aforementioned base station control device. And the base station device has neighbor lists issued from the aforementioned base station control device as its initial value. The base station control device, on the basis of a report from the mobile terminal, has a step of removing a list not used as a handover destination from the initial neighbor lists and also a step of adding a list of a station not given so far in the neighbor lists into the initial lists.

In accordance with the present invention, when a shill is desired from an existing system to a new system or when the new system is introduced while also maintaining the existing system, neighbor lists used so far in the existing system can be used in the new system. As a result, an initial investment cost, which has required for neighbor list creation when the new system is introduced, can be remarkably reduced, thus enabling smooth introduction of the new system and quick start of services of the new system.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram for explaining the period of a PN signal of the base station device and a phase for base station identification;

FIG. 10 is a diagram for explaining the initial phase of the PN signal of the base station device;

DESCRIPTION OF THE EMBODIMENTS

Embodiments of the present invention will be detailed in connection with illustrated embodiments.

Figure 1:
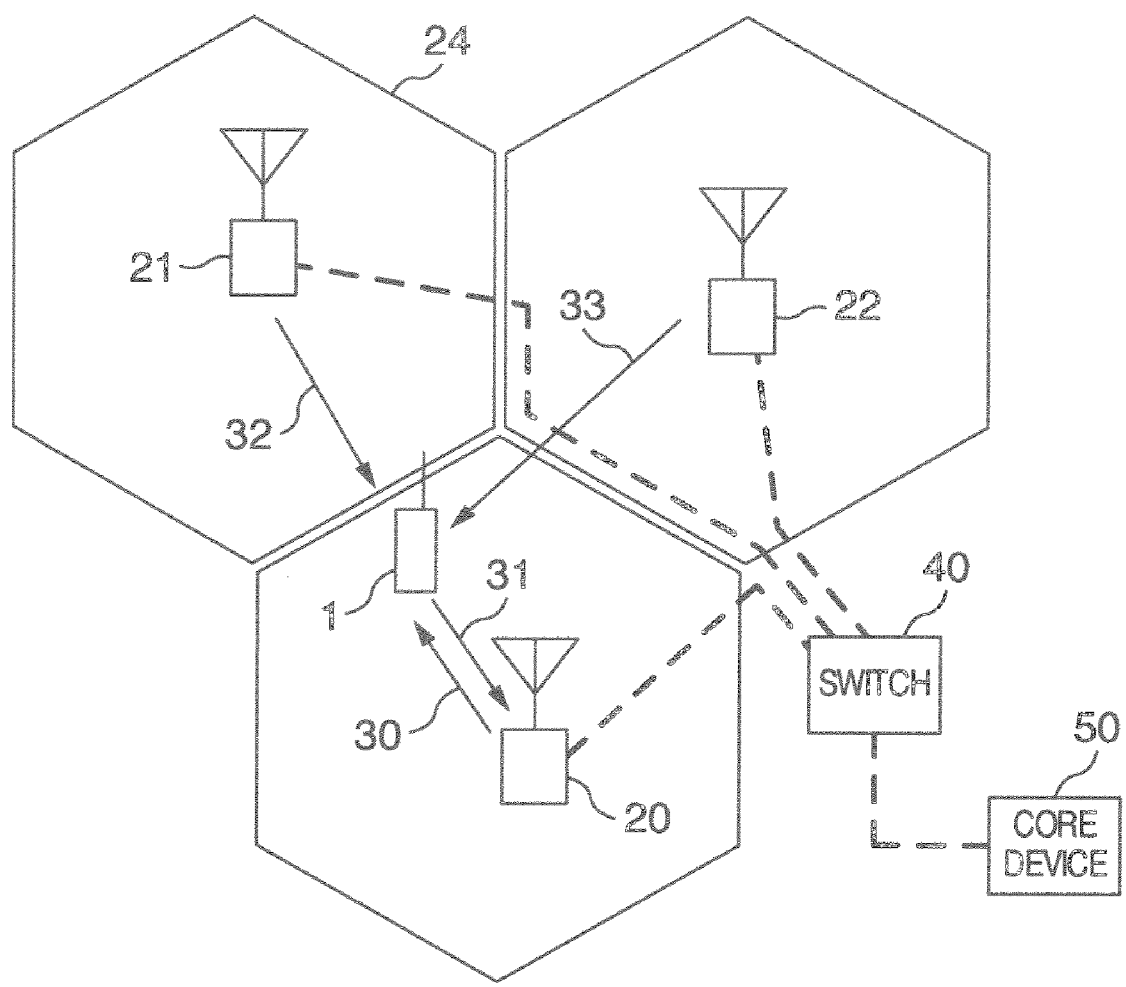
FIG. 1 is a diagram for explaining an exemplary configuration of a mobile communication system to which the present invention is applied.

FIG. 1 shows an exemplary configuration of a mobile communication system to which the present invention is applied.

Base station devices 20 to 22 communicate with a core device 50 to be connected to a core network. A signal from the core device 50 is input to the base station device 20 via a switch 40. The base station device 20 converts the signal received from the core device 50 into a radio frequency signal and transmits a radio signal 30 as the converted signal to a mobile terminal 1. The mobile terminal 1 communicates with the core device 50 by receiving the radio signal 30 transmitted from the base station device 20 and performing signal processing operation over the radio signal to convert the signal to information.

Information generated by the mobile terminal 1, on the other hand, is converted to a radio frequency signal in the mobile terminal 1 and then transmitted to the base station device 20 in the form of a radio signal 31. The radio signal 31 transmitted from the mobile terminal 1 and received by the base station device 20 is converted in the base station device 20 through its signal processing operation into information, and then transmitted to the core device 50 via the switch 40. The base station devices 20 to 22, when connected to the core device 50 via the switch 40 transmit or receives different signals respectively.

In the illustrated example, the mobile terminal 1 is present in the vicinities of the base statin device 20 and of a boundary between the base station devices 21 and 22 as shown in FIG. 1. The mobile terminal 1 identifies the adjacent base station devices 21 and 22 by their signals received therefrom and measures the intensities of such signals. On the basis of the measured result, the mobile terminal compares these signal intensities with the intensity of the signal received from the base station device 20 now communicating therewith. When the intensity of the signal received from the adjacent base station 21 or 22 is higher than a specified threshold value, the mobile terminal shifts the current mode to a handover mode.

Figure 2:
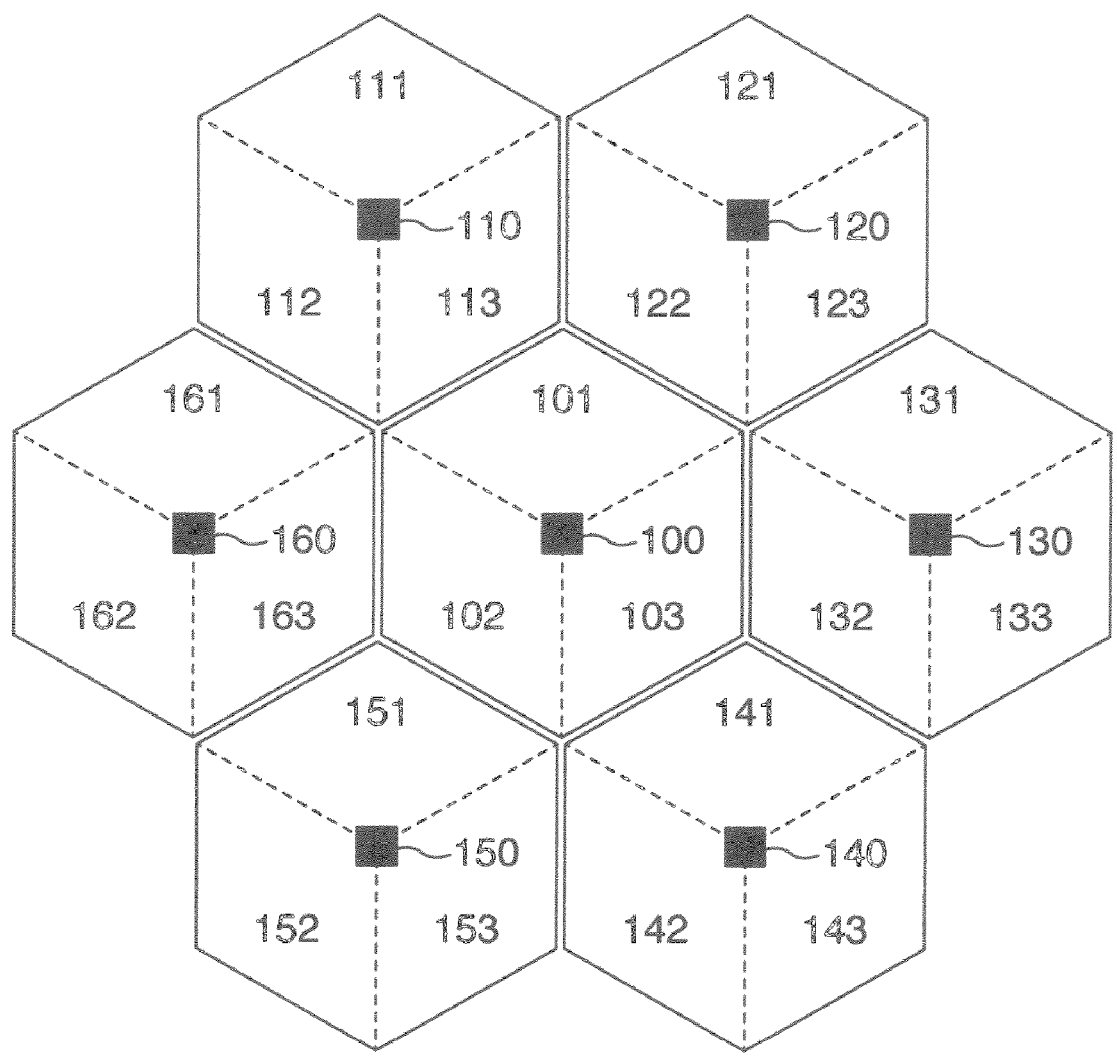
FIG. 2 is a diagram for explaining an example when a plurality of base station devices are located in the mobile communication system of the invention.

FIG. 2 is a diagram for explaining an example a plurality of base station devices are located in the mobile communication system to which the present invention is applied.

In FIG. 2, each base station has a wireless communication zone called a cell in which radio wave emitted from each base station device can reach a mobile terminal therein. A sector refers to one of angular divisions of a space based on the directivity of an antenna. A dot shown by a black square indicates a location at which a base station device is installed. In the illustrated example, 7 base stations are located in the respective cells. Each base station has a directional antenna, and the cell is divided into 3 sectors from the base station as a center by the directional angle of the service area. For example, a base station 100 covers 3 areas (sectors) 101, 102, and 103. As also will be seen from FIG. 2, 7 base station devices cover cells as many, as 21, and the cells operate as "cells" connected to respectively different antennas. Even with respect to the aforementioned handover, handover between sectors is the same as handover between base stations when viewed from the mobile terminal.

Figure 3:
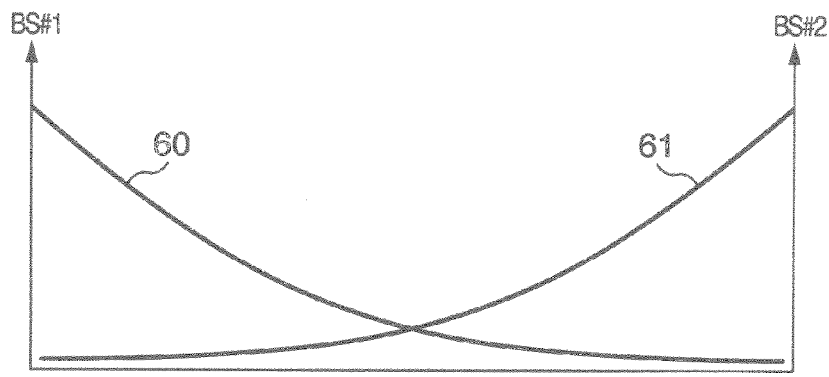
FIG. 3 is a diagrammatical graph showing intensities of signals from adjacent two base stations in the mobile communication system.

FIG. 3 is a diagrammatical graph showing intensities of signals from adjacent two base stations in the mobile communication system to which the present invention is applied.

In FIG. 3, abscissa denotes a distance between base stations and ordinate denotes a signal intensity. As shown in FIG. 3, the intensities of the signals transmitted from the adjacent 2 base stations vary with their propagation distance. In other words, the intensities of the signals received by the mobile terminal decrease with the longer propagation distances.

The intensity of the signal transmitted from a base station #1 is shown by a curve 60. The intensity of the signal transmitted from a base station #2 is shown by a curve 61. As illustrated, the longer the propagation distance is the more the signal intensity attenuates, and a relationship between the base stations in the intensity of the received signal is inverted nearly at a middle point between the base stations. For example, as the mobile terminal so far connected to the base station #1 moves toward the base station #2, the power of the signal transmitted from the base station #1 is reduced. On the contrary to the above case, as the power of the signal transmitted from the base station #2 is gradually increased, and a relationship between the base stations #1 and #2 in the signal intensity is inverted in the vicinity of the middle point. The mobile terminal when sensing the fact or the base station when receiving its report determines handover and gets ready for its handover procedure.

Figure 4:
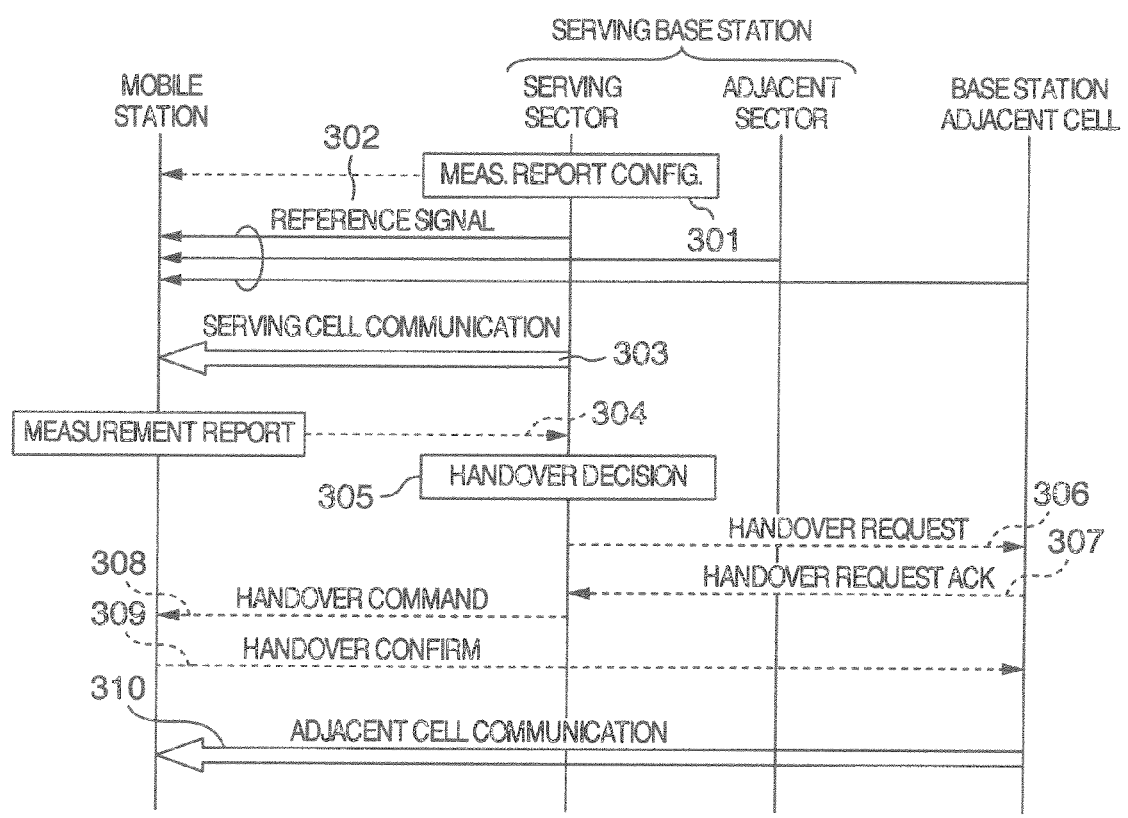
FIG. 4 is a diagram for explaining an example of handover sequences in the mobile communication system of the invention.

FIG. 4 is a chart for explaining an exemplary handover sequence in the mobile communication system of the present invention.

FIG. 4 show a sequence among 4 nodes of a mobile terminal (mobile station), sectors (serving sectors, adjacent sectors) of the same base station, and an adjacent base station (adjacent cell). In the example of FIG. 4, the sequence is an example when a handover is made from the serving sector to the adjacent base station.

First of all, measurement setting (step 301) is made from the serving sector to the mobile terminal. The measurement setting is carried out, for example, at the timing of start of a call connection. In the measurement setting, various settings can be made including instruction of periodical measurement and repot based on event setting.

The mobile terminal when receiving the setting measures the power of a reference signal 302 issued from the sector of each base station. The reference signal forms a PN sequence (pseudo random number sequence) which can be extracted by performing correlation operation with a code sequence coinciding with that of a transmission side. The power of the signal from the base station or section in question can be measured by measuring the power of the extracted signal.

The mobile terminal communicates with the serving sector (303). When the results of the received signal power measurement of a plurality of the sectors (cells) satisfy specified event conditions, the mobile terminal issues a report to the serving sector to inform the serving sector of the satisfaction of the event conditions (304). In this case, explanation has been made in connection with the example when the report is generated according to the satisfaction of the even conditions. However, the report may be periodically generated with a determined time interval.

The base station of the serving sector determines whether or not to perform the handover on the basis of the report result (305). When determining the handover, the base station transmits a handover request to the adjacent base station as a target (306). The handover request includes connection conditions of the mobile terminal now being connected. The adjacent target base station checks the connection conditions and determines several conditions such as permission or non-permission of admission control, and then transmits an acknowledge (response) signal to the serving sector (307).

The serving base station when receiving the handover acknowledge from the target base station sends a handover command to the mobile terminal (308). Though not illustrated, the mobile terminal when accepting the handover command tries to be synchronized with the target base station and to receive broadcast information therefrom. The mobile terminal, when successfully achieving the synchronization and information reception, transmits a handover confirmation message to the target base station (309). At this stage, the handover operation has been completed.

Attention is now directed to the reception of the reference signal (302). Reliable achievement of the handover requires that the mobile terminal can reliably separate the reference signals transmitted from the respective base stations for the respective base stations of the transmission originators, and measure the powers of the received and separated reference signals. The respective base stations transmit individual PN codes to the mobile to final at the physical layer level of wireless communication so that the mobile terminal can identify between the base stations by the individual PN codes even when the base stations simultaneously transmit signals of the same frequency.

Explanation will next be made as to generation of the PN signals in the base stations, the period of the PN signal, and a phase for identification between the base stations, by referring to FIGS. 8 and 9.

Figure 8:
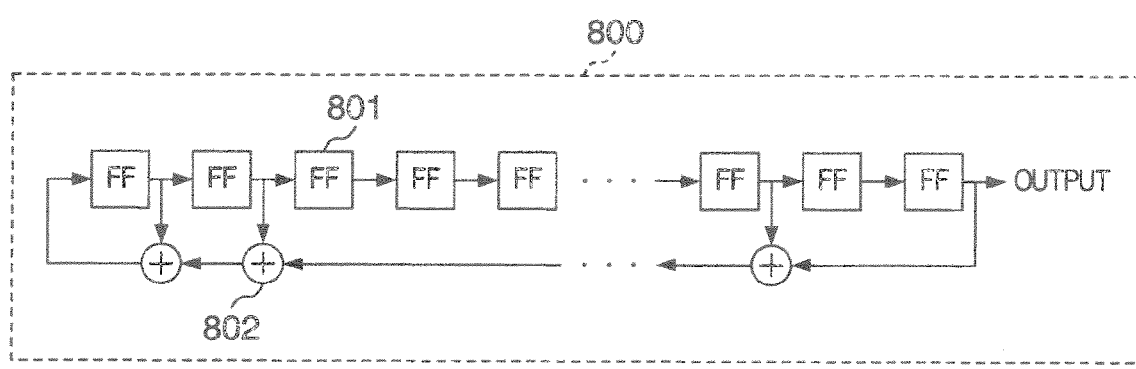
FIG. 8 is a diagram for explaining an exemplary arrangement of a PN signal generator of the base station device.

FIG. 8 is a diagram for explaining an exemplary structure of a PN signal generator 800 in the base station device.

FIG. 9 is a diagram for explaining the period of the PN signal of the base station device and the phase for identification between the base stations.

A typical exemplary structure of the PN signal generator is shown in FIG. 8.

In this example, blocks for generating the PN signal include a plurality of stages of flip-flops (referred to merely FFs) 801. Assuming that the number of FF stages is denoted by N, then the PN signal generator has $2^N-1$ states. Some of the FF states are fed back by an XOR 802 to embody a polynomial to generate a PN sequence. With such a structure, the state of the PN signal generator is cycled in a determined order while the $2^N-1$ states satisfy the pseudo random number conditions. When the state is cycled by one cycle (the PN signal generator passes through a pattern of the $2^N-1$ states), the same sequence is again repeated (the PN signal generator outputs the same pattern of $2^N-1$ states).

Such a manner is shown in FIG. 9. The PN signal generator has one cycle of $2^N-1$ states and repetitively outputs the same pseudo random number sequence at the intervals of the cycle. In some code division multiple access (referred to merely as CDMA) methods, the aforementioned characteristic is employed to use the PN sequence as a reference (or pilot) sequence. And the phase of the PN sequence is used to identify between cells (or base stations) as shown in FIG. 9. In the illustrated example, identifiers for cells (or base stations) are denoted by numbers 0 to 511, and the state of the PN signal code sequence is divided into $2^N-1$ or 512 equal states. An interval between adjacent two of the 512 identifiers is denoted by $\Delta$. The cell (or base station) having the identifier 0 starts the PN sequence at a specified time from a position "0" in the drawing. The cell (or base station) having the identifier 1 starts the PN sequence at a specified time from a position "1" in the drawing. This means that the station having an identifier of a phase 1 leads the PN sequence by the phase $\Delta$ at the same time with respect to the station having an identifier of the phase 0 and transmits it. In this way, a plurality of cells (or base stations) are defined as having 512 (from 0 to 511) identifiers K, L, . . . (such as one cell having an identifier K and a cell adjacent thereto having an identifier L, and so on).

Assume a mobile terminal that currently connects a cell (or base station) with an identifier K and the cell broadcasts a neighbor list the cell (or adjacent station) with an identifier L. At that case, the mobile terminal may not search all of the one cycle of the $2^N-1$ states shown in FIG. 9. The terminal searches the vicinity of the PN code possibly transmitted with a phase difference $(L-K)\Delta$ with respect to the cell (or base station) currently being synchronized and connected thereto, and L is informed using neighbor list. As a result, the mobile terminal can determine whether or not to able to receive the signal of the corresponding adjacent base station and can remarkably reduce the quantity of searching operation for the adjacent cells (or adjacent base stations).

Explanation will then be made as to the identifier of a cell (or base station) in another system. In such a system as an LTE system, a similar mechanism is employed but cells (or base stations) using the PN sequence are identified by a method different from the above case. An example of the above identifying method is shown in FIG. 10.

FIG. 10 is a diagram for explaining the initial phase of a PN signal of a base station device.

In the LTE or similar system, not the phase but the initial value is vital. How to generate a PN sequence has been already explained in FIG. 8. The PN signal generator 800 is again illustrated in FIG. 10. FIG. 10 is different from FIG. 8 in that not the phase of the PN sequence but the initial value periodically set at FFs is used as s cell (or base station) identifier. The PN sequence set at the specified system timing. At this time, an initial value given to each FF. Some of the initial values are used as identifiers of cells or base stations) in FIG. 10, a part 900 denotes an initial value for the PN generator. The initial value is expressed by a bit sequence which has an upper part (MSB) and a lower part (LSB). In this case, identifiers of cells (or base stations) correspond to a hatched lower part 901. In the system of generating a PN signal in this manner, even ones of cells (base stations) having consecutive numbered identifiers but different only by 1 are arranged not sequentially but randomly (that is, cells of the identifiers 0, 1, 2 . . . are arranged not in an order of 0, 1, 2, . . . ) are arranged) when viewed from a phase relationship of the PN sequence as shown in the upper section of FIG. 10. In other words, such a system of applying identifiers to cells (or base stations) by applying the initial value of the PN signal thereto as shown in FIG. 10 is different in identifier numbering method from such a system of applying identifiers to cells (or base stations) as explained in FIG. 9.

As already explained in "BACKGROUND OF THE INVENTION", when it is desired to introduce a new system is desired, its key point is to utilize the resources of an old system as much as possible. For example, such a mechanism as to use a power supply or a frame in the old system as it is highly effective for reduction of an initial cost. Consider no collocation system in which new stations are installed at the same location as in an old system, for example, by utilizing a power supply or a frame in the old system as it is, that is, without exchanging it with new one. The word "installed at the same location" includes a case of installation at a common location or added installation. In this connection, if the new and old systems have the same frequency band, then the same antenna as in the old system can be commonly used in the new system. Even when the frequency band of the new system is largely different from the frequency band of the old system, a new antenna may be installed at the same building as in the old system. In other words, the antenna position may substantially not be changed.

Meanwhile, the identifiers of base stations are differently named depending upon the application system in their type and applying method. For example, with respect to the type, a CDMA 2000 system has, as choices, 512 identifiers and an LTE system of 3GPP has 504 identifiers. Such 512 or 504 identifiers cannot individually identify tens of thousands of base stations necessary for covering the entire service area cannot be identified only by such 512 or 504 identifiers. Within a specific area, the corresponding base stations can be identified by such identifiers. However, since such identifiers are re-used in a remote area, such identifiers cannot be used in a nationwide area. With regard to the name applying method, further, the method of creating base station identifiers and the name applying method are largely different in different systems, as explained in connection with the examples of the CDMA and LTE systems in FIGS. 9 and 10.

In the collocation system, it is desired to use the resources of the old system as many as possible. However, since the identifiers of adjacent base station information are differently generated and named from in the old system as mentioned above, the neighbor list used in the old system cannot be used as it is in the new system. In order to use the neighbor list used in the old system in the new system, it becomes necessary to convert the neighbor list.

Explanation will be made as to a conversion procedure of enabling the neighbor list of the old system to be used in the new system.

Figure 5:
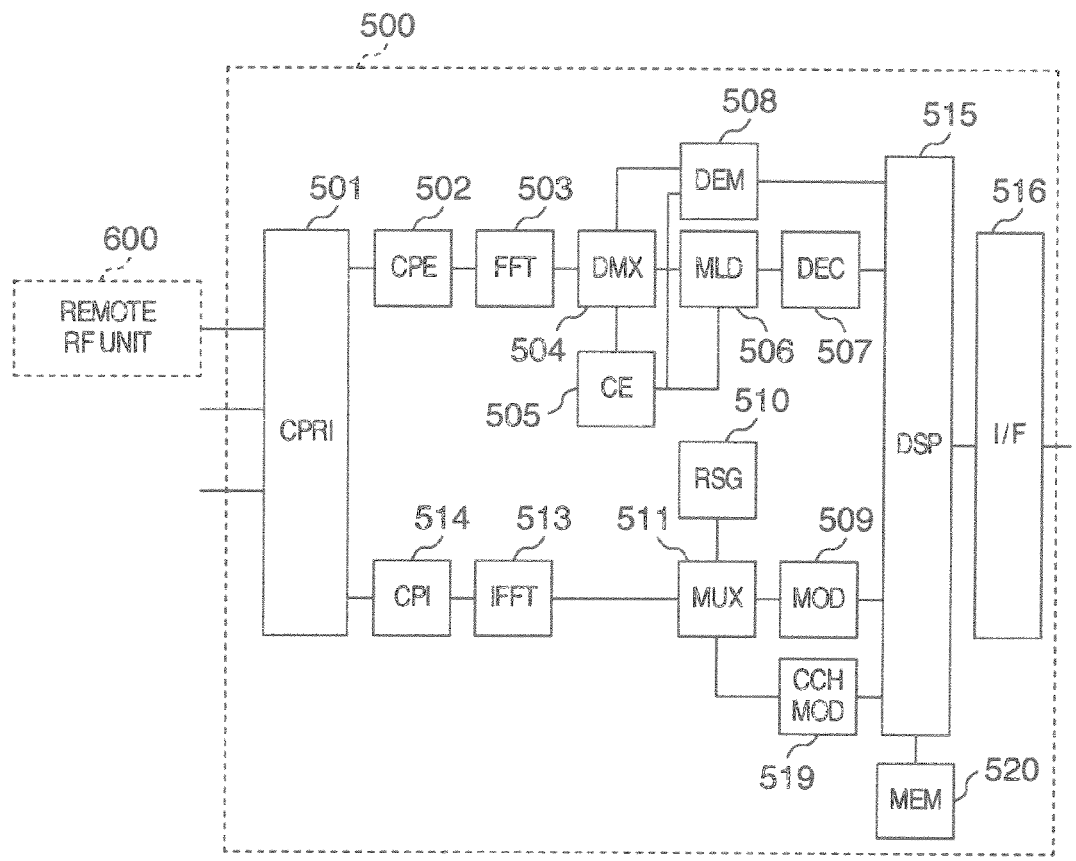
FIG. 5 is a diagram of an arrangement of a base station device (mainly of a baseband unit) in the mobile communication system of the invention.
Figure 6:
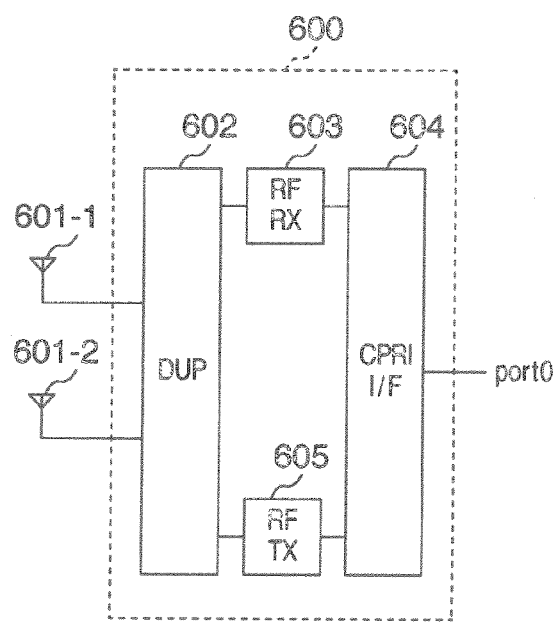
FIG. 6 is a diagram of an arrangement (mainly of a remote RF section) of the mobile communication system of the invention.

A structure of a base station in the mobile communication system to which the present invention is applied will be first explained by referring to FIGS. 5 and 6.

FIG. 5 is a diagram of a structure of a base station device (mainly of a base band unit) in the mobile communication system of the present invention.

FIG. 6 is a diagram of a structure of a base station device (mainly of a remote RF unit) in the mobile communication system of the invention.

Explanation will first be made as to a signal receiving channel. A signal received by an antenna 601 in FIG. 6 is sent to a duplexer 602 and then to a receiving circuit 603 to be converted to a baseband signal. The converted baseband reception signal is converted by an interface 604 as a CPRI (Common Public Radio Interface) to a signal format preferably compatible with optical fiber communication, and then sent to a baseband unit 500 from its port O.

In the baseband unit 500 shown in FIG. 5, next, the received optical signal is input to the baseband unit from the left side of FIG. 5, converted by an interface 501 as the CPRI to a signal format preferably as an electric signal, and then temporarily stored in a memory in the interface 501. In this case, the CPRI interface can be connected with a plurality of remote RF units 600. As an example, one remote unit is considered to have a divided function corresponding to one sector. In such a case, the memory of the CPRI is provided to have a capacity corresponding to a plurality of sectors, and the signal is extracted therefrom in a time multiplexing manner in a later stage so that processing of the different sectors can be implemented by the same hardware. It is assume in the following explanation that the baseband unit processes a plurality of sectors. In this connection, explanation will be made in connection with the processing of one sector as an example.

A CPE 502 removes CP at suitable timing from the reception signal read out from the memory of the interface 501. The CP-removed reception signal is converted by an FFT (Fast Fourier Transform) 503 from its time domain to frequency domain. The converted information is divided into functional elements by a demultiplexer 504. First one of the functional elements is a reference signal for estimating a propagation channel. The reference signal is passed to a channel estimator 505 to estimate the propagation channel. Second one of the functional elements is a control channel. The control channel is set to a demodulator 508 to be detected and decoded using the estimated result of the propagation channel issued from the channel estimator 505 to obtain significant control information. The obtained result is passed to a DSP 515. The DSP 515 is provided actually in the form of a CPU or a DSP chip, which will be generally called merely DSP in the following explanation. The control information includes adjacent sectors measured by the mobile terminal, the measured results of a reception signal powers or the like of adjacent cells, and fast feedback information such as CI (Channel Quality Indicator), RI (Rank Indicator) or PMI (Precoding Matrix Indicator). Third one of the functional elements is user data, which is sent to an MLD (Most Likelihood Decision) 506. The MLD 506 determines a maximum likelihood for the user data and finds an LLR (Log-Likelihood Ratio) on the basis of the estimated channel result. A decoder 507 performs its turbo decoding operation on the basis of the obtained LLR to extract significant information therefrom. The extracted information is sent to the DSP 515. The DSP 515 processes the information with respect to the layer 2 or 3, and then transmits the processed information from a line interface 516 to a not-shown network device.

Next down-link processing will be explained. Information transmitted from the network is input from the line interface 516 into a memory 520 of the DSP 515. The DSP 515 processes the received information with respect to the layer 2 or 3. The DSP 515, which incorporates a scheduler, selects a suitable user from information of a plurality of users in a radio state and determines allocation of a specific frequency resource. The DSP 515 processes a plurality of sectors on a time division basis and stores set information and user data belonging thereto in the common memory 520

The layer-2 or -3 processed data based on the determined result of the scheduler built in the DSP 515 is passed to a demodulator 509. The demodulator 509 performs its channel coding operation such as turbo coding operation or interleaving operation, and its converting operation to 16QAM or the like over the received data. The modulated result is applied to a multiplexer 511 and performs its channel assigning operation on the basis of the scheduling result for each function. The channel assigning, operation means to map information of transmission code to 3 dimensions of frequency, OFOM symbol and transmission antenna. The multiplexer 511 further can apply an individual precoding matrix to the transmission signal for each antenna for beam forming in a spatial direction. The multiplexer 511 allocates the resources not only for the user information but also for a reference signal generated by a reference signal generator 510, and a control channel of the layer-2 or -3 control information created by the DSP 515 and coded modulated by a control information encoder 519, to a suitable frequency, time and antenna. In this case, the reference signal generator 510 generates a PN sequence using its individual initial value to identify between adjacent cells (or base stations) and the serving cell (or base station), as already explained in FIG. 10. An output of the multiplexer is applied to an IFFT 513 and to a CPI 514 to be processed, and then passed to the CPRI interface 501 having a CP. The CPRI interface 501 converts the received data to a signal format suitable for optical transmission and transmits it to the remote RF unit 600. The remote RF unit 600 shown in FIG. 6, when receiving the information from the port O, sends the received information to the CPRI interface 604 to convert the received information suitable as a transmission signal. The converted signal is sent to a transmitting 605 to be converted from the baseband signal to a radio signal and amplified, and then sent to the duplexer 602 and the antennas 601 to be transmitted therefrom.

Explanation will then be made as to a signal transmitter in a CDMA base station.

Figure 7:
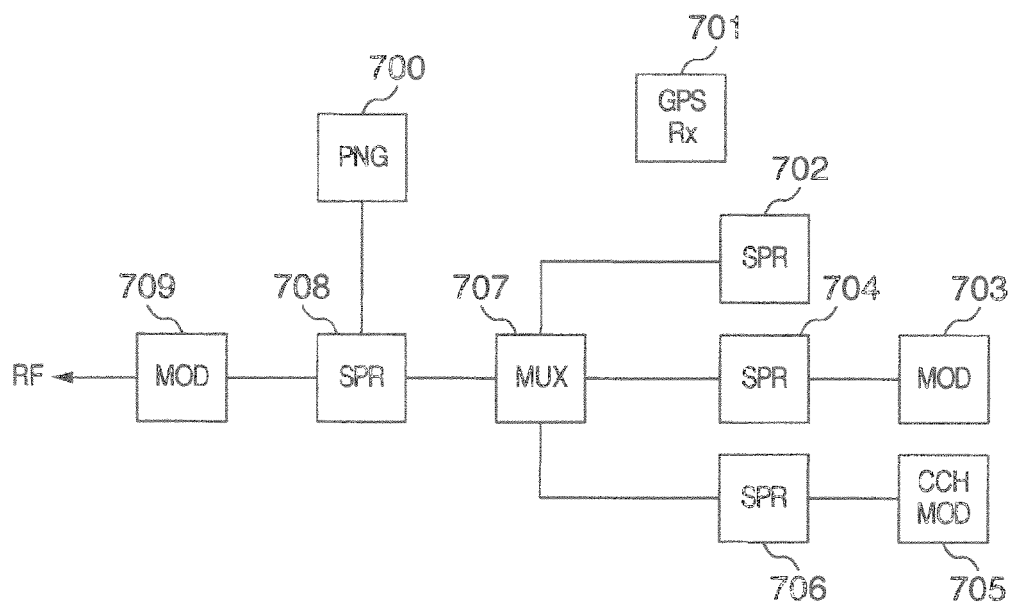
FIG. 7 is a diagram of an arrangement (mainly of a signal transmitter of a CDMA system) of the mobile communication system of the invention.

FIG. 7 shows a diagram of a configuration of a base station device (a signal transmitter in the CDMA system) in the mobile communication system to which the present invention is applied.

A GPS receiver is used to accurately synchronize the PN signal transmission timing of the base stations. The PN signal transmission timing is generated at the timed moment. A pilot signal is generated as a specific signal sequence by an SPR 702. Transmission user data is generated by processing the information transmitted from the network at a coder 703 and applying the processed information to a spread code at a spread 704. A control channel transmission signal is similarly generated by encoding the control channel at a coder 705 and applying a spread code thereto at a spread 706. The generated control channel transmission signal is combined with the user data signal at a combiner 707 into a single transmission signal. A PN sequence is applied to the transmission signal at a spread 708. The PN sequence is generated by a PN generator 700 in synchronism with the GPS. In this case, the PN generator 700 such a PN sequence as to have individual phase differences for the respective cells (base stations) so that the cells (or base stations) can be identified individually, as already explained in FIG. 9. A spread signal generated by the spread 708 is modulated by a modulator 709 and then sent to the RF unit.

Explanation will next be made as to the configuration of a collocation base station device.

Figure 11:
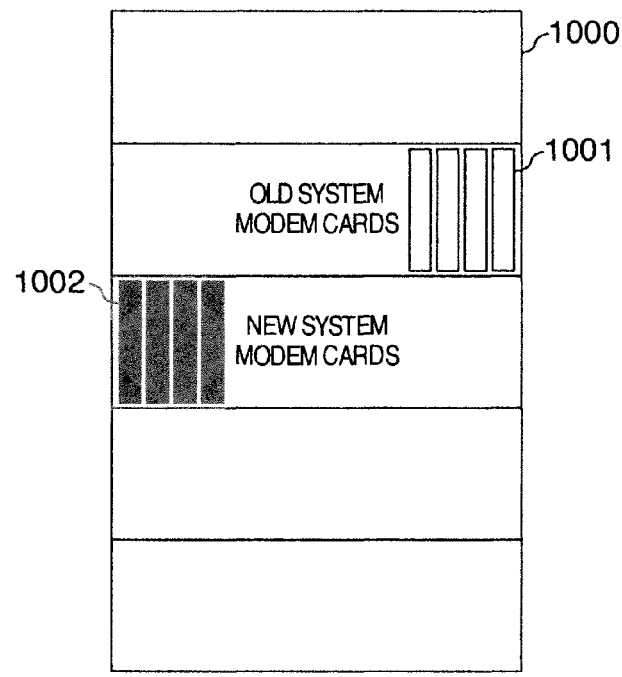
FIG. 11 is a diagram for explaining an exemplary structure of the collocated base station devices.

FIG. 11 shows an exemplary configuration of a collocation base station device.

FIG. 11 illustrates an imagery base station device embodying the collocation. A frame 1000 for a base station device and a modem card 1001 in an old system are already provided in the site of each base station device. When a modem card 1002 for a new system is loaded into an idle slot of the frame, the modem card can be used for the new system. Since the base station device for the collocation system can be formed in this way, the need for preparing a new facility space can be eliminated, additional installation such as power supply facility can be minimized, and its investment cost can be remarkably reduced.

The above configuration has been given only as an example. Thus, the embodiment of the present invention is not limited only to the collocation base station device of such a configuration. For example, the invention has various forms of the collocation method, as when not an identical frame but adjacent frames are provided and a signal is transmitted using a common antenna. The present invention can cope with such various collocation forms.

Explanation will then be made as to a configuration of a collocation base station device and control devices located in a network.

Figure 12:
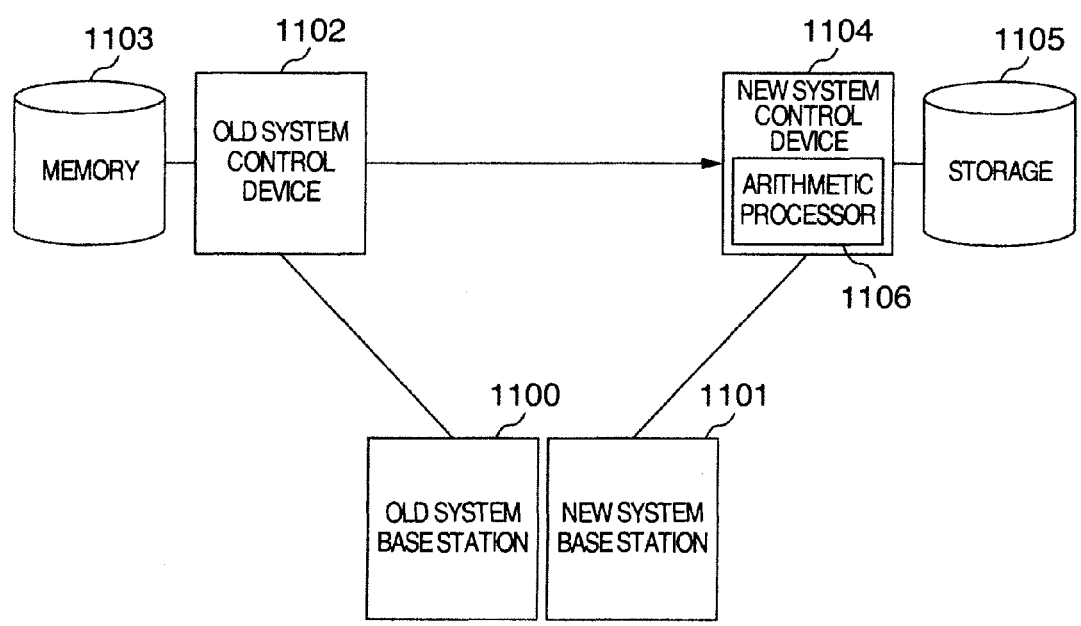
FIG. 12 is a diagram for explaining an exemplary configuration of the collocated base station device and control devices located in a network.

FIG. 12 is a diagram for explaining an exemplary configuration of a collocation base station device and control devices located in a network. In an actual network configuration, various nodes, switches and so on are provided therein to manage data transmitted and received to and from base stations. For simplicity of explanation, however, such nodes and switches are not illustrated and omitted.

Exchange of a neighbor list between old and new systems will be explained by referring to FIG. 12, a collocated base station 1100 of the old system and a base station 1101 of the new system are connected to respectively different control devices. The old system is connected to a control device 1102. The new system is connected to a control device 1104. The control device 1102 has a memory 1103 to store management information therein, and such management information as a neighbor list is stored in the memory. Upon formation of the new system, the neighbor list of the old system is extracted from the memory 1103 and transmitted to the control device 1104. The control device 1104 has an arithmetic processor 1106 to convert the neighbor list of the old system to a neighbor list for the new system. The control devices 1104 and 1102 have each not only an arithmetic processor but also an interface with a base station, an interface with an upper-level device of the control device, and a memory for storing a program or the like for causing the arithmetic processor to control the base station or the processing of the present invention to be executed. Since the present invention is featured by the conversion of the neighbor list a general arrangement in the control device is not detailed nor illustrated. The converted neighbor list compatible with the new system is stored in a storage 1105. When a new card is loaded as shown in FIG. 11 to be connected to the network in the base station 1101, the base station 1101 issues a request to the control device 1104 to cause the control device to transmit configuration data. The control device 1104 extracts configuration information and the neighbor list information compatible with the base station 1101 from the storage 1105, and transmits the information to the base station 1101. The base station 1101 stores the received information therein to complete its initialization.

Conversion of a neighbor list will be explained in connection with an example.

Figure 13:
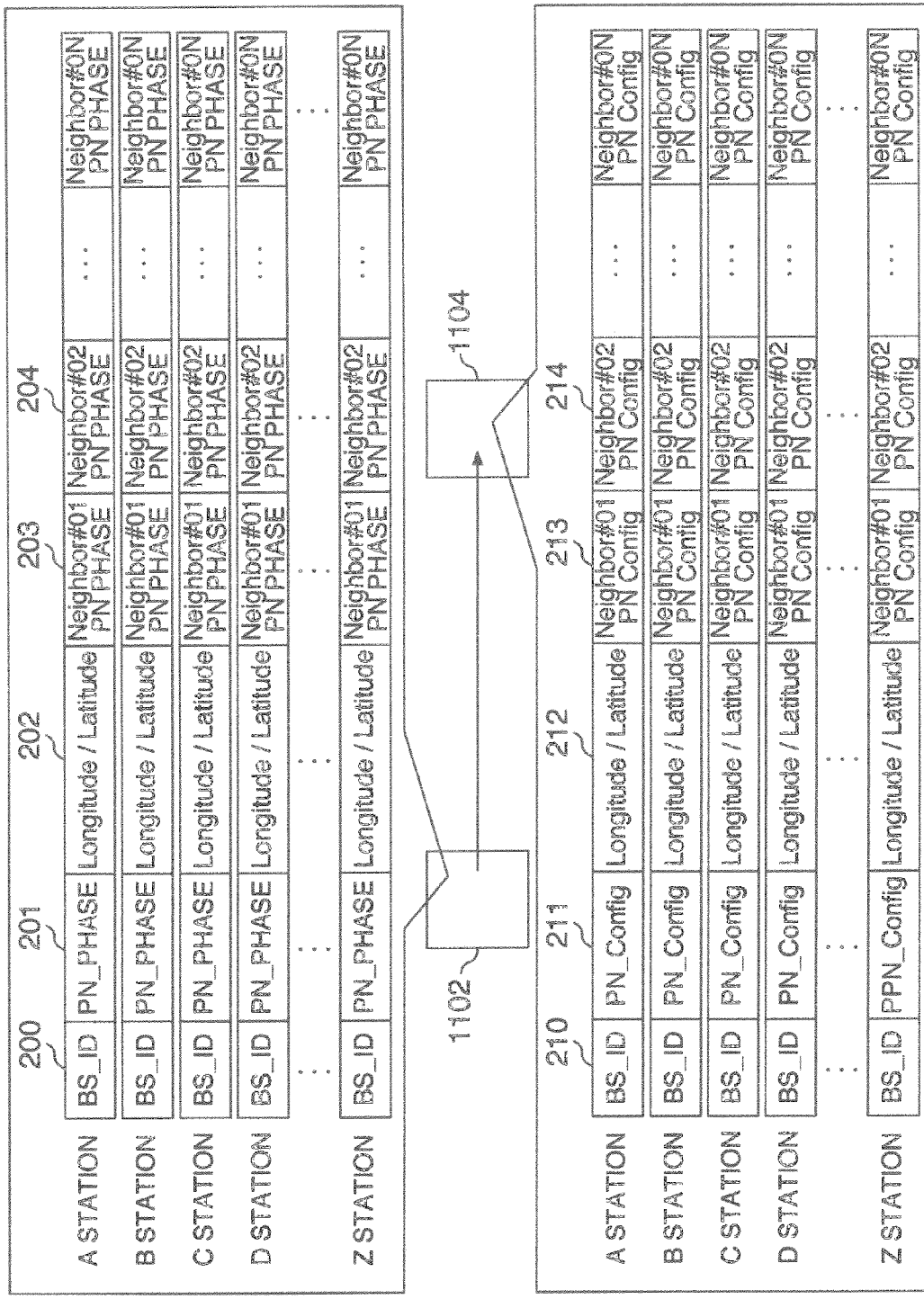
FIG. 13 is an example of neighbor lists managed by the control devices.

FIG. 13 is a diagram of neighbor lists to be managed by control devices.

FIG. 13 shows a difference between the neighbor lists of old and new systems. In the neighbor list managed by the control device 1102 of the old system, a base station inherent ID (200), PN phase information (201) associated with the base station, longitude/latitude information (202) obtained from the GPS, phase information (203, 204, . . . ) of neighbor PN, and so on are listed. In the neighbor list of the new system, on the other hand, a base station inherent ID (210), a PN initial value (211) of the base station, latitude/longitude information (212) obtained from the GPS, initial values (213, 214, . . . ) of neighbor PN, and so on are listed. Since the PN phase of the old system as the identifier of the base station is not associated with the PN initial value of the new system necessarily in a one-to-one relationship, conversion is required. It is also possible to collate the inherent ID (200) of the old system with the inherent ID (210) of the new system. However, this requires the inherent ID (210) of the new system to be accurately allocated. When such works are manually conducted, this is considered to involve an error and thus cannot attain the effectiveness of automatic setting. In order to avoid this, in the present embodiment, latitude/longitude information obtained from the GPS is used to link the PN phase to the inherent ID and to convert the neighbor list fully automatically.

Explanation will be made as to conversion of a neighbor list using latitude/longitude information obtained from a GPS. The conversion of the neighbor list generally includes two steps. First one of the two steps is to "recognize the fact that the base stations of old and new systems are installed at the same location". The second step is to "the neighbor list of the old system is once replaced with a global ID of a base station and then to make it compatible with that of the new system".

Figure 14:
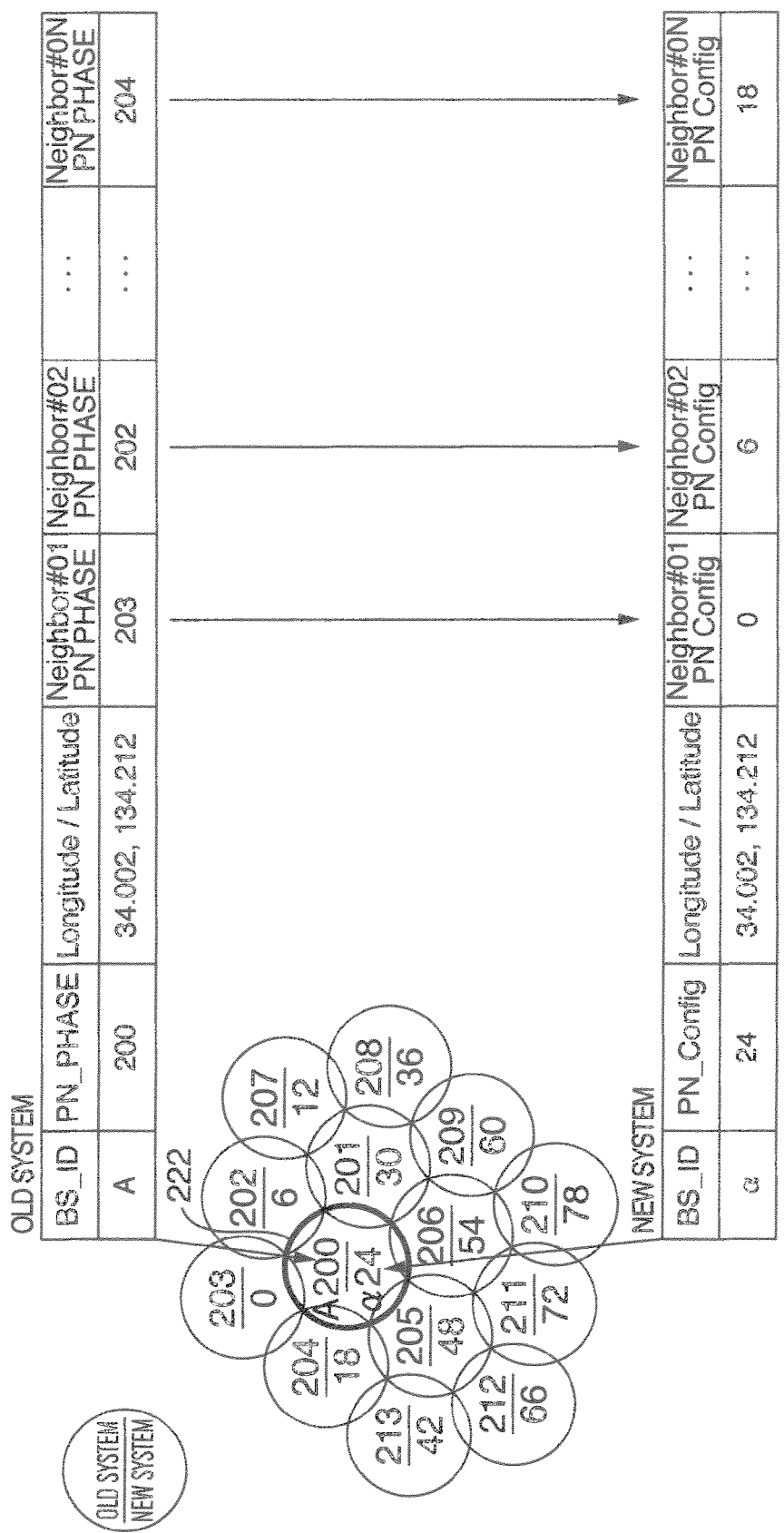
FIG. 14 is a diagram for explaining an example of conversion of neighbor lists.

Explanation of First Step:

FIG. 14 is a diagram for explaining the conversion of a neighbor list.

In of an example of FIG. 14, base stations are located as shown in FIG. 2 and the base stations of the old and new systems are collocated with each other.

In the drawing, base stations encircled by a bold circle line means that a base station A of the old system is collocated with a base station α of the new system. Explanation will be made in connection with an exemplary procedure of converting the neighbor list of the base station A of the old system to a neighbor list of the base station α of the new system.

It is first required to determine the base stations A and α are to be collocated with each other. In other words, it is required to carry out the first step of "recognizing the fact that the base stations of the new and old systems are installed at the same location". For this determination, latitude/longitude information obtained from the GPS is employed. With respect to the latitude/longitude information, even when a common antenna of the GPS is used for the new and old systems, different environments therebetween in measurement time or the like may, in some cases, cause the two base stations of the old and new systems not to have perfectly the same latitude/longitude information. However, since the other base station is installed usually hundreds of meters or more away from one base station, one base station is considered not to be erroneously taken as the other base station. Thus it is relatively easy to achieve matching between the base stations in base station level. Therefore, when the base station a of the new system is installed to be collocated with the base station A of the old system, the control system first finds latitude/longitude information using the GPS and locates the base station A as the matched base station. Since a base station in this area is considered to be only the base station A having a PN_PHASE of 200, the control system can determine that the base station having the PN_PHASE of 200 is converted to the base station having a PN_Config of 24 in the new system.

Explanation of Second Step:

After the control system determines a correlation between the PN_PHASE of the old system and the PN_Config of the new system in the first step, conversion between the neighbor lists in FIG. 14 can be attained. That is, the second step is to "replace the neighbor list of the old system once to the global ID of the base station and then to make it compatible with the new system".

At the stage of introducing the new system, it is considered to sequentially add a new base station. For this reason, at the system introduction stage, even when the control system tries to find a base station of the new system associated with one base station of the old system, the base station of the new system is considered not to be installed yet. Thus it is considered that many base stations in the new system which cannot achieve matching with the associated base station IDs are present. In this case, q neighbor list is prepared while such not-matched base stations are ignored. When new base stations are increased and installed, matching between the old and new system in latitude/longitude information is newly established, and a correlation between the PN_PHASE and PN_Config is newly found from the matched relationship; the associated neighbor list is updated.

In FIG. 14, when the following correlation is already found from the past matching result in this area;

(PN_PHASE 203⇔PN_Config 0)
(PN_PHASE 202⇔PN_Config 6)
(PN_PHASE 201⇔PN_Config 30)
(PN_PHASE 206⇔PN_Config 54)
(PN_PHASE 205⇔PN_Config 48)
(PN_PHASE 204⇔PN_Config 18)

the neighbor list information (203, 202, 201, 206, 205, 204) of the base station A of the old system is converted based on the above information to neighbor list information (0, 6, 30, 54, 48, 18) of the base station α of the new system.

Explanation will now be made as to points to be considered in the management of the neighbor list.

Figure 15:
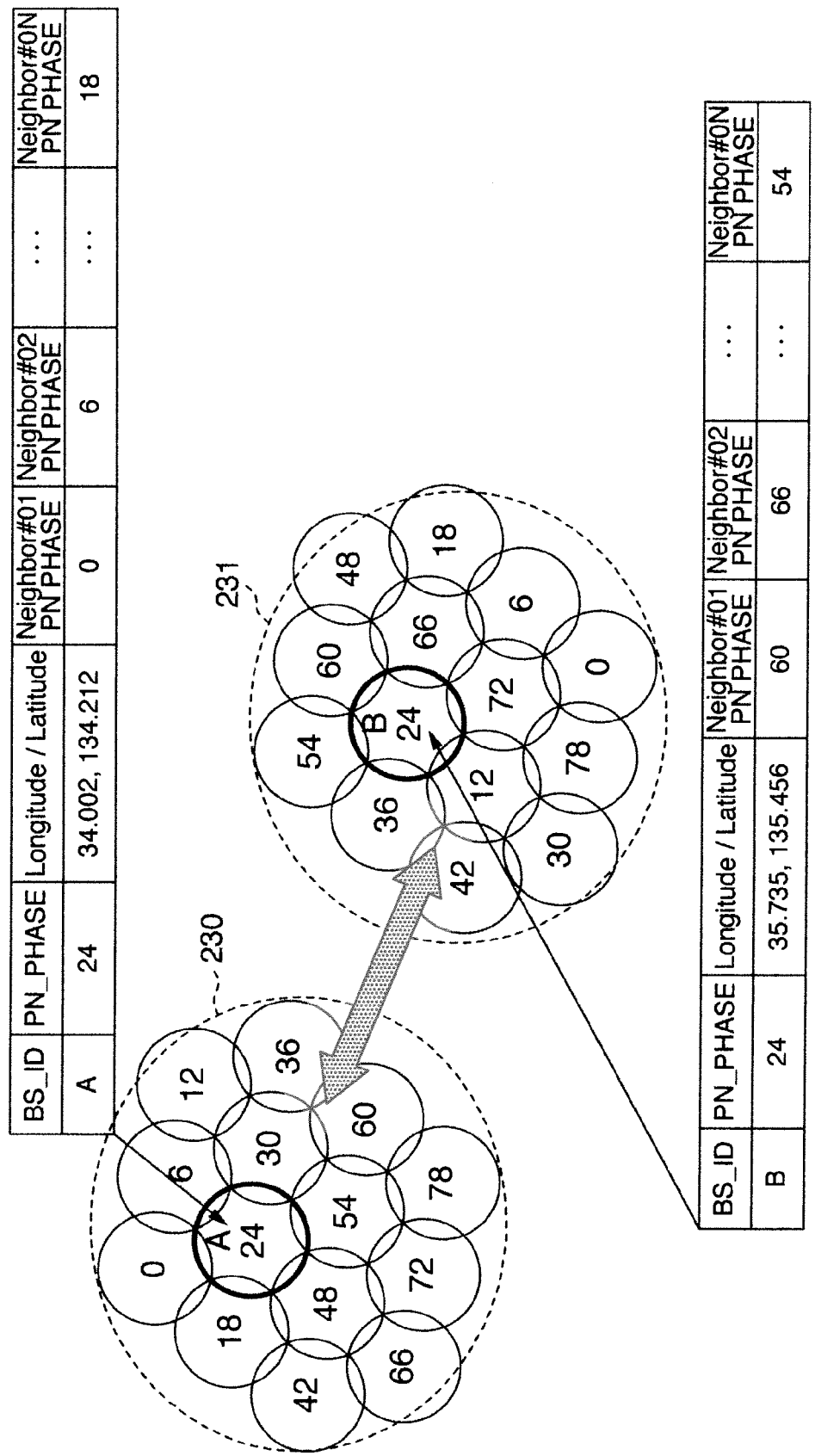
FIG. 15 is a diagram for explaining neighbor lists.

FIG. 15 shows how PN_PHASEs in the old system and PN_Configs in the new system are reused. In a wireless system, base stations as many as tens of hundreds are nationwide installed to cover the entire areas of the nation, but the number of types of identifiers (PN_PHASEs or PN_Configs) of the physical layer as already explained earlier is 500 at the most. Thus it is necessary to reuse such identifiers fully between areas spaced by a suitable distance from each other. FIG. 15 show such a manner. The base station identifiers are required to be reused, but the neighbor list is a parameter depending upon each area and cannot be reused. In the example of FIG. 15, it will be seen that the base station A has a PN_PHASE of 24, but there are a huge number of base stations having a PN_PHASE of 24, and the identifier 24 is valid only in a limited area (an area surrounded by a dotted line 230 in the illustrated example) forming a cluster. Note that, in another cluster 231, a base station having a PN_PHASE of 24 is a base station not A but B.

Figure 16:
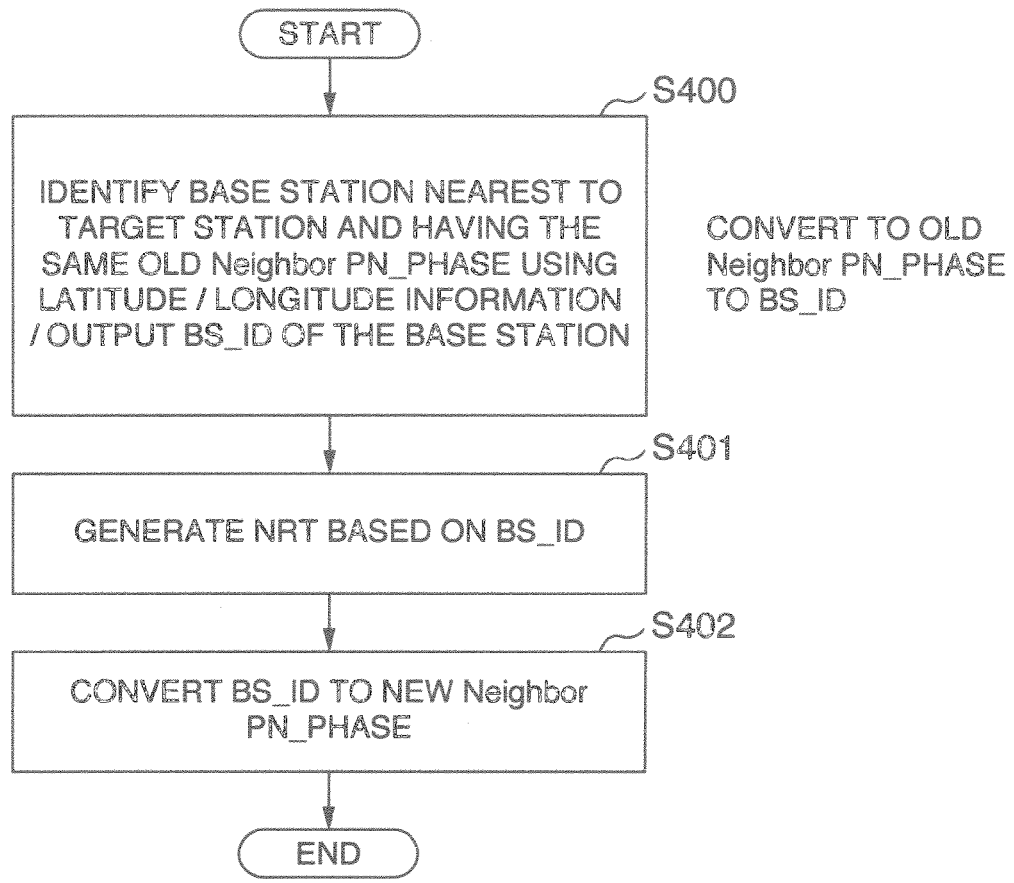
FIG. 16 is a flow chart for explaining an operational flow in a neighbor list conversion method in an embodiment of the present invention.

Considering the above point, the arithmetic processor 1106 of the control device 1104 in FIG. 12 operates such a neighbor list converting algorithm as shown in FIG. 16.

FIG. 16 is a flow chart for explaining a method of converting a neighbor list in an embodiment of the present invention.

In a first step 400, the control device converts an identifier of physical layer included in a neighbor of the old system to a BS_ID (global BS_ID) inherent in the nation. Upon the conversion, the control device converts, using the latitude/longitude information and PN_PHASE, information of PN_PHASE of adjacent base station shown in the neighbor list to an BS_ID. When the control device searches the neighbor list for the BS_ID from the PN_PHASE, a plurality of BS_ID candidates appear as shown in FIG. 15. However, by using latitude/longitude information of the base station in question at the same time, the control device can limit its searching range only to the base station adjacent to the base station in question. The control device can selects the BS_ID having the corresponding PN_PHASE from the limited range of candidates.

In a next step 401, the control device converts the entire neighbor list to prepare a neighbor list of such BS_IDs.

The control device of the new system knows correlation information the BS_IDs and the PN_Configs of the new system. The control device, using the information, converts the neighbor list of the BS_IDs prepared in the step 401 to a neighbor list of PN_Configs of the new system. In this case, linking of the BS_IDs of the new system to the BS_IDs of the old system is carried out based on nearly coincided latitude/longitude information obtained from the GPS, as already explained earlier.

Through the aforementioned processing flow, a neighbor list of the new system can be automatically generated.

Figure 17:
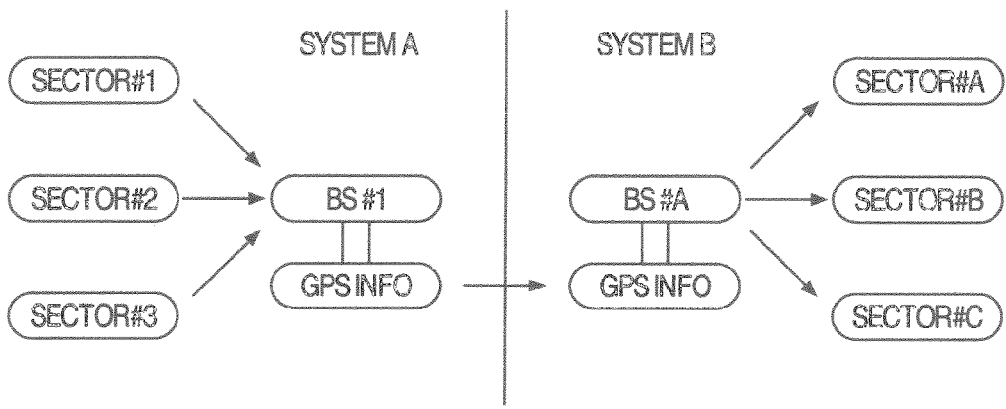
FIG. 17 is a conceptual view for explaining the neighbor list conversion method in a system of a sector configuration.
Figure 18:
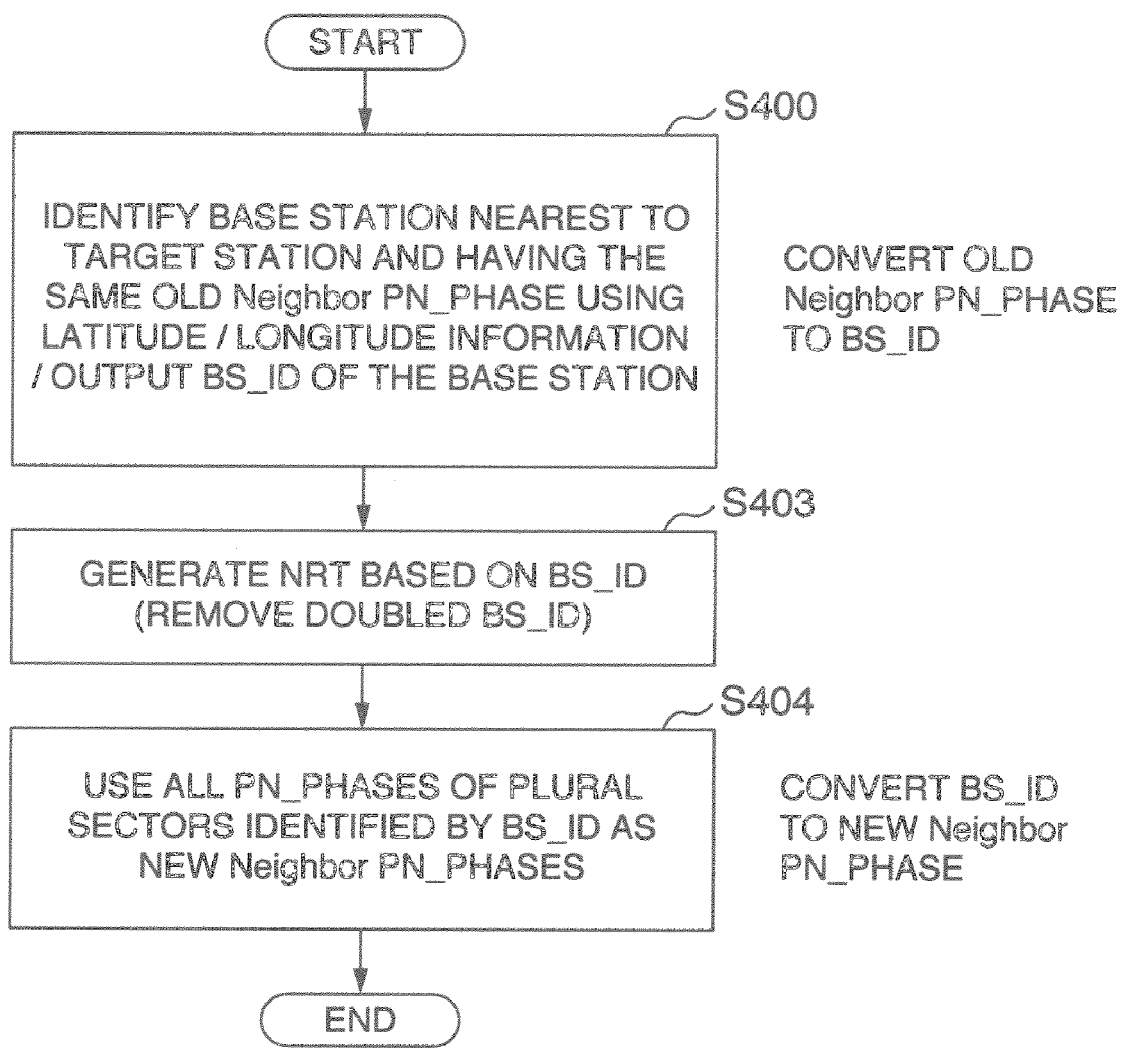
FIG. 18 is a flow chart for explaining the neighbor list conversion method in the system of the sector configuration.

FIG. 17 is a diagram for explaining a case when old and new systems are both of a sector arrangement. In the above example, linking between the old and new systems based on the GPS information has been carried out. In this method, however, each sector has no resolution, and thus when different sectors have different neighbor lists, converting operation is required to pay consideration to the sector arrangement. FIG. 18 shows a flow chart considering the above point.

Differences between FIGS. 18 and 16 are steps 403 and 404. In a first step 403, the control device combines information about 3 sectors into a single piece of information. Upon the combination, the same idea as set sum is applied thereto. Assuming, for example, that a sector 1 is a combination of sectors (1, 2, 4), a sector 2 is a combination of sectors (1, 3, 5) and a sector 3 is a combination of sectors (1, 6), then a combined neighbor list has all the sectors (1, 2, 3, 4, 5, 6) and neighbor sectors seen in all the sector added.

In the step 404, the obtained neighbor list is applied to all the sectors, which means to use the same neighbor list for all the sectors. For this reason, the neighbor list becomes rather large, but this presents no problem. The aim of the present invention is to automatically create the neighbor list more efficiently upon introduction of the new system. Such a new system as an LTE system has a mechanism of automatically updating the neighbor list on the basis of a report from the mobile terminal after the system introduction. For this reason, only the initial value is required. Since the automatic updating is carried out in such a manner that the neighbor list becomes more accurate, a somewhat large neighbor list is previously prepared as an initial value, so as to be sequentially optimized by performing the automatic updating for each sector after the system introduction.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In a wireless communication network including a first wireless communication system having a plurality of first base stations and a second wireless communication system having a plurality of second base stations of a collation relationship with the plurality of first base stations in the first wireless communication system, a method of automatically generating a neighbor list for the second wireless communication system on the basis of a neighbor list for the first wireless communication system, wherein base station identifiers to the first base stations in the first wireless communication system and base station identifiers to the second base stations in the second wireless communication system are generated and applied thereto according respective predetermined rules so that a predetermined specific number of ones of the base station identifiers in each system are repetitively applied to plural ones of the base stations, linking between the first and second base stations is carried out by collating positional information of a plurality of the first base stations included in the neighbor list of the first wireless communication system with positional information of the plurality of second base stations, the base station identifiers of the neighbor list of the first wireless communication system are converted to base station identifiers of the second wireless communication system on the basis of a linked result to generate the neighbor list of the second wireless communication system.

2. The neighbor list generating method according to claim 1, wherein the positional information used for collation between the plurality of the first base stations included in the neighbor list of the first wireless communication system the plurality of the second base stations is latitude/longitude information obtained from a UPS.

3. A wireless communication network including a first wireless communication system having a plurality of first base stations and a first control device for controlling the plurality of first base stations and also including a second wireless communication system having a plurality of second base stations installed at the same location as the plurality of first base stations of the first wireless communication system and a second control device for controlling the plurality of second base stations, wherein base station identifiers to the first base stations of the first wireless communication system and base station identifiers to the second base stations of the second wireless communication system are generated and applied thereto according to respective predetermined rules so that a predetermined specific number of the base station identifiers are repetitively applied to a plurality of the base stations in each system, the first control device manages the neighbor list for handover in the first wireless communication system, the second control device receives the neighbor list from the first control device and collates positional information of the plurality of the first base stations included in the received neighbor list with positional information of the second wireless base stations to link the first base stations to the second base stations, the base station identifiers of the first wireless communication system in the neighbor list are converted to the base station identifiers of the second wireless communication system on the basis of a linked result to generate the neighbor list of the second wireless communication system.

4. A wireless communication network according to claim 3, wherein the positional information for use of collation between the plurality of the first base stations included in the neighbor list of the first wireless communication system and the plurality of the second base stations is latitude/longitude information obtained from a GPS.

5. A control device in a wireless communication network including a first wireless communication system having a plurality of first base stations and a first control device for controlling the first base stations and also including a second wireless communication system a plurality of second base stations installed at the same location as the plurality of first base stations of the first wireless communication system and a second control device for controlling the second base stations, base station identifiers to be applied to the first base stations in the first wireless communication system and base station identifiers to be applied to the second base stations in the second wireless communication system are generated according to respective predetermined rules so that a predetermined number of the base station identifiers are repetitively applied to a plurality of the base stations in each system, linking between the first and second base stations is carried out by receiving a neighbor list from the control device of the first wireless communication system and collating positional information of the plurality of the first base stations included in the received neighbor list with positional information of a wireless base station, the base station identifiers of the first wireless communication system in the neighbor list are converted to base station identifiers of the second wireless communication system on the basis of a linking result to generate the neighbor list of the second wireless communication system.

6. A control device according to claim 5, wherein the positional information for use of collation between the plurality of the first base stations included in the neighbor list of the first wireless communication system and the plurality of the second base stations is latitude/longitude information obtained from a GPS.

* * * * *